US009381815B2

(12) United States Patent
Yamanaka et al.

(10) Patent No.: US 9,381,815 B2
(45) Date of Patent: Jul. 5, 2016

(54) ABNORMALITY DIAGNOSTIC APPARATUS FOR VEHICLE

(71) Applicant: Mitsubishi Jidosha Kogyo Kabushiki Kaisha, Tokyo (JP)

(72) Inventors: Yasuhiro Yamanaka, Okazaki (JP); Takashi Nonaka, Kasugai (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/149,591

(22) Filed: Jan. 7, 2014

(65) Prior Publication Data

US 2014/0195097 A1    Jul. 10, 2014

(30) Foreign Application Priority Data

Jan. 8, 2013    (JP) .................................. 2013-001377

(51) Int. Cl.
*B60L 3/00*    (2006.01)
*B60L 11/12*    (2006.01)
(Continued)

(52) U.S. Cl.
CPC ............. *B60L 3/0023* (2013.01); *B60L 11/123* (2013.01); *B60L 11/14* (2013.01); *B60L 11/1861* (2013.01); *B60L 2220/42* (2013.01); *B60L 2240/527* (2013.01); *B60L 2240/547* (2013.01); *B60L 2250/16* (2013.01); *B60L 2260/28* (2013.01); *Y02T 10/6217* (2013.01); *Y02T 10/648* (2013.01); *Y02T 10/7005* (2013.01); *Y02T 10/705* (2013.01); *Y02T 10/7044* (2013.01); *Y02T 10/7077* (2013.01); *Y10S 903/903* (2013.01)

(58) Field of Classification Search
USPC ........................................................ 701/29.1
See application file for complete search history.

(56) References Cited

U.S. PATENT DOCUMENTS 5,414,339 A * 5/1995 Masaki ................... B60L 3/003
                                                    318/139
5,471,384 A * 11/1995 Nakashima ............... B60L 3/04
                                                    180/65.1
5,537,011 A *  7/1996 Bachman ................ B60L 15/20
                                                    318/34

(Continued)

FOREIGN PATENT DOCUMENTS

JP    2004-11456 A    1/2004
JP    2005-20944 A    1/2005

(Continued)

OTHER PUBLICATIONS

Machine translation of JP,2012-105511,A (http://www4.ipdl.inpit.go.jp/Tokujitu/tjsogodbenk.ipdl) (May 13, 2014).*

(Continued)

*Primary Examiner* — John R Olszewski
*Assistant Examiner* — Jean-Paul Cass
(74) *Attorney, Agent, or Firm* — Birch, Stewart, Kolasch & Birch, LLP

(57) ABSTRACT

An abnormality diagnostic apparatus for a vehicle, which can accurately determine whether or not there is an abnormality in a voltage detection unit, while curtailing a cost increase, is provided. Output voltages Va, Vb, Vc outputted from voltage detection units are acquired, and differences |Va−Vb|, |Vb−Vc|, |Vc−Va| between the acquired output values are calculated. If any of the calculation results is greater than a determination threshold value, it is determined that there is an abnormality in any of the voltage detection units.

4 Claims, 5 Drawing Sheets

(51) Int. Cl.
  *B60L 11/14*   (2006.01)
  *B60L 11/18*   (2006.01)

(56) References Cited

U.S. PATENT DOCUMENTS

| | | | | |
|---|---|---|---|---|
| 5,650,707 | A * | 7/1997 | Lipo | B60L 11/1803 318/773 |
| 6,018,694 | A * | 1/2000 | Egami | B60K 6/24 180/65.23 |
| 6,166,517 | A * | 12/2000 | Wakashiro et al. | 320/104 |
| 6,262,491 | B1 * | 7/2001 | Kitajima et al. | 290/40 C |
| 6,314,346 | B1 * | 11/2001 | Kitajima et al. | 701/22 |
| 7,200,499 | B2 * | 4/2007 | Aridome | G01R 31/3648 702/64 |
| 8,305,043 | B2 * | 11/2012 | Yamamoto | B60K 6/48 320/127 |
| 8,423,232 | B2 * | 4/2013 | Tsutsumi | B60K 6/445 477/34 |
| 2002/0030494 | A1 * | 3/2002 | Araki | G01R 31/361 324/427 |
| 2003/0042866 | A1 * | 3/2003 | Minamiura | G01R 31/3658 320/104 |
| 2003/0085621 | A1 * | 5/2003 | Potega | B60L 11/185 307/18 |
| 2006/0005055 | A1 * | 1/2006 | Potega | G06F 1/1632 713/300 |
| 2006/0276981 | A1 * | 12/2006 | Aridome | G01R 31/3648 702/64 |
| 2009/0087722 | A1 * | 4/2009 | Sakabe | B60L 3/0046 429/61 |
| 2009/0091332 | A1 * | 4/2009 | Emori | B60L 11/1855 324/537 |
| 2009/0108674 | A1 * | 4/2009 | Ozaki | B60L 3/0046 307/10.6 |
| 2009/0251103 | A1 * | 10/2009 | Yamamoto | B60K 6/48 320/133 |
| 2012/0020136 | A1 * | 1/2012 | Akaishi | B60L 11/1851 363/131 |
| 2012/0032505 | A1 * | 2/2012 | Kusumi | B60L 11/123 307/10.1 |
| 2012/0109478 | A1 * | 5/2012 | Mochiyama et al. | 701/68 |

FOREIGN PATENT DOCUMENTS

| | | |
|---|---|---|
| JP | 2009-171645 A | 7/2009 |
| JP | 2011-109851 A | 6/2011 |
| JP | 2012-105511 A | 5/2012 |
| JP | 2012-131240 A | 7/2012 |
| JP | 2012131240 A * | 7/2012 |

OTHER PUBLICATIONS

Machine translation of JP,2005-020944,A (http://www4.ipdl.inpit.go.jp/Tokujitu/tjsogodbenk.ipdl) (dated May 13, 2014).*

Machine translation of JP,2011-109851,A] (http://www4.ipdl.inpit.go.jp/Tokujitu/tjsogodbenk.ipdl) (dated May 13, 2014).*

* cited by examiner

ABNORMALITY DIAGNOSTIC APPARATUS FOR VEHICLE

The entire disclosure of Japanese Patent Application No. 2013-001377 filed on Jan. 8, 2013 is expressly incorporated by reference herein.

TECHNICAL FIELD

This invention relates to an abnormality diagnostic apparatus for a vehicle which diagnoses an abnormality in the characteristics or the like of a voltage detection sensor loaded on a vehicle.

BACKGROUND ART

An electrically driven vehicle such as an electric vehicle or a hybrid vehicle, for example, is loaded with a plurality of electric motors driven by electric power supplied from a battery, such as a traction motor and a generator. Some electrically driven vehicles are equipped with a plurality of voltage detection units, such as voltage sensors, which detect supply voltages supplied from the battery to the respective electric motors, for detecting the inverter drive voltages for these electric motors.

Normally, the inverter drive voltages for the electric motors can be accurately detected by these plural voltage sensors. If an abnormality in characteristics or the like occurs in the voltage sensor itself, however, the inverter drive voltages for the electric motors may fail to be detected accurately.

To deal with such a problem, a device is available which, for example, has a dual sensor configuration, and compares the detection values of the two sensors to detect a sensor abnormality (see, for example, Patent Document 1).

PRIOR ART DOCUMENTS

Patent Documents

[Patent Document 1] JP-A-2011-109851

SUMMARY OF THE INVENTION

Problems To Be Solved By the Invention

By adopting the above-mentioned technology, it is conceivable that the inverter drive voltage for the electric motor (electric rotating machine) can be detected accurately. By the sensor doubling, however, the problems arise that the number of the components is increased, and the costs are increased accordingly.

The present invention has been accomplished in the light of the above-mentioned situations. It is an object of this invention to provide an abnormality diagnostic apparatus for a vehicle, which can accurately determine whether or not there is an abnormality in the voltage detection unit, while curtailing a cost increase.

Means For Solving the Problems

A first aspect of the present invention for solving the above problems is an abnormality diagnostic apparatus for a vehicle, comprising: a battery loaded on a vehicle; a plurality of rotating electric machines electrically connected to the battery; a plurality of rotating electric machine control units for controlling the rotating electric machines; a plurality of voltage detection units, provided in the rotating electric machine control units, for detecting voltages of power lines connecting the battery and the rotating electric machines; a difference calculation unit for acquiring output values outputted from the voltage detection units and calculating differences between the acquired output values; and an abnormality determination unit which, when any of results of calculations by the difference calculation unit is greater than a preset determination threshold value, determines that there is an abnormality in any of the voltage detection units.

According to the first aspect above, an abnormality in the characteristics of the voltage detection unit is determined based on the difference between the output values (supply voltages) acquired for the input voltages of the driving inverters for the rotating electric machines. Thus, the abnormality in the characteristics (will hereinafter be referred to as "characteristics abnormality") of the voltage detection unit can be diagnosed accurately.

A second aspect of the present invention is the abnormality diagnostic apparatus for a vehicle according to the first aspect, wherein any of the plurality of voltage detection units is provided in such a manner as to be common to any of the plurality of rotating electric machine control units.

According to the second aspect mentioned above, the characteristics abnormality of the voltage detection unit can be diagnosed accurately, and an abnormality of the rotating electric machine control units to which the voltage detection unit is common can be diagnosed.

A third aspect of the present invention is the abnormality diagnostic apparatus for a vehicle according to the first or second aspect, wherein the abnormality determination unit determines whether or not there is an abnormality in the voltage detection unit, on condition that a shift range selected by a transmission, which the vehicle has, is a parking range or a neutral range.

A fourth aspect of the present invention is the abnormality diagnostic apparatus for a vehicle according to the first or second aspect, wherein the abnormality determination unit determines whether or not there is an abnormality in the voltage detection unit, on condition that a shift range selected by a transmission, which the vehicle has, is a drive range, and that the rotating electric machine control unit is stopping.

According to the third or fourth aspect, with the driving inverter for the rotating electric machine being inoperative, the supply voltage is detected. Thus, variations in the detection values by the voltage detection units are suppressed. Hence, the characteristics abnormality of the voltage detection unit can be determined more accurately.

A fifth aspect of the present invention is the abnormality diagnostic apparatus for a vehicle according to any one of the first to fourth aspects, further comprising a threshold value correction unit for making a correction for decreasing the determination threshold value in accordance with the state of the battery.

According to the fifth aspect, the determination threshold value is corrected as appropriate, so that the characteristics abnormality of the voltage detection unit can be detected at an earlier stage.

Effects of the Invention

According to the present invention, as described above, the characteristics abnormality of the voltage detection unit can be diagnosed accurately and, eventually, the inverter drive voltage for each electric motor can be detected always accurately by the voltage detection unit. Moreover, the abnormality diagnostic apparatus for a vehicle according to the present invention can be realized by the configuration of the exiting

MODE FOR CARRYING OUT THE INVENTION

Embodiments of the present invention will be described in detail with reference to the accompanying drawings.

(Embodiment 1)

Figure 1:
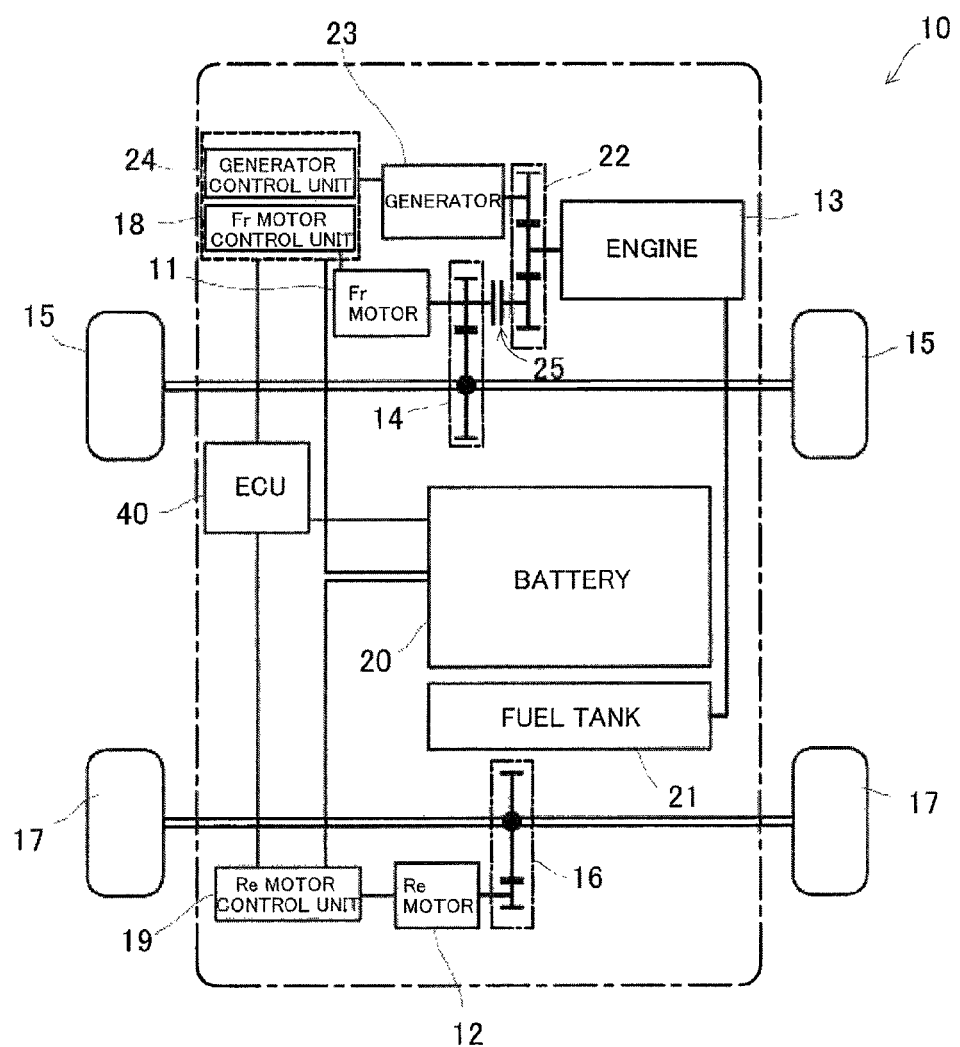
FIG. 1 is a view showing the schematic configuration of a vehicle according to Embodiment 1 of the present invention.

As shown in FIG. 1, a vehicle 10 according to the present embodiment is a so-called hybrid car having, as a drive source for traveling, a front (Fr) motor 11 and a rear (Re) motor 12 which are electric motors (rotating electric machines), and an engine 13. The driving force of the front motor 11 is transmitted to front wheels 15 via a front power transmission mechanism 14. The driving force of the rear motor 12 is transmitted to rear wheels 17 via a rear power transmission mechanism 16.

To the front motor 11, a battery 20 is connected via a front (Fr) motor control unit (control circuit) 18 which is a rotating electric machine control unit. To the rear motor 12, the battery 20 is connected via a rear (Re) motor control unit 19 which is a rotating electric machine control unit. That is, the front motor 11 and the rear motor 12 are supplied with electric power (supply power) from the battery 20 via the front motor control unit 18 and the rear motor control unit 19, respectively.

The engine 13 is driven by combustion of fuel supplied from a fuel tank 21. The engine 13 is connected to a generator (electric power generator) 23, which is an electric motor, via an output system 22. To the generator 23, the battery 20 is connected via a generator control unit 24. Thus, the generator 23 can supply electric power (generated electricity) to the battery 20 via the generator control unit 24. The output system 22 is connected to the generator 23, and also connected to the front power transmission mechanism 14 via a clutch 25.

As described above, the vehicle 10 according to the present embodiment is equipped with the front motor 11 and the rear motor 12 which are driven by the supply power supplied from the battery 20. That is, the vehicle 10 is equipped with a plurality of the motor control units (rotating electric machine control units) and the electric motors (rotating electric machines) that are driven by the supply power supplied from the battery 20. As stated above, moreover, the front motor 11, the rear motor 12 and the generator 23 are connected, respectively, to the battery 20 via the front motor control unit 18, the rear motor control unit 19 and the generator control unit 24 which are the motor control units.

Figure 2:
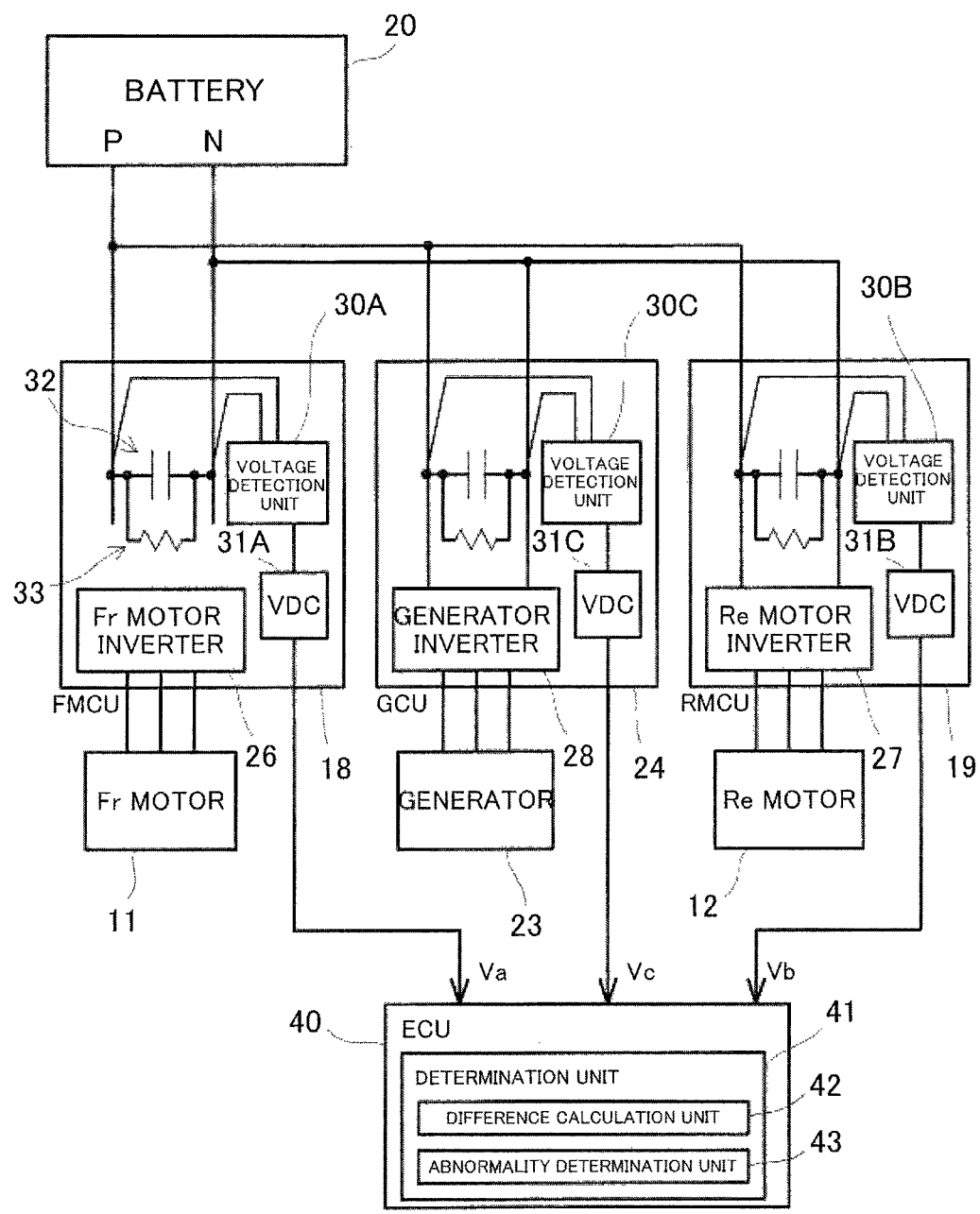
FIG. 2 is a view showing the schematic configuration of an abnormality diagnostic apparatus for the vehicle according to Embodiment 1 of the present invention.

As shown in FIG. 2, the front motor control unit (FMCU) 18 has a front (Fr) motor inverter 26, and the front motor 11 is connected to the front motor inverter 26. Similarly, the rear motor 12 is connected to a rear motor inverter 27 of the rear motor control unit (RMCU) 19, and the generator 23 is connected to a generator inverter 28 of the generator control unit (GCU) 24.

Furthermore, the front motor control unit 18, the rear motor control unit 19 and the generator control unit 24 are provided with voltage detection units 30 (30A, 30B, 30C), which detect supply voltages supplied from the battery 20 to the front motor 11, the rear motor 12 and the generator 23, and conversion units (VDC) 31 (31A, 31B, 31C). The voltage detection units 30A, 30B, 30C detect the inverter drive voltages for the front motor 11, the rear motor 12 and the generator 23. In the present embodiment, the respective control units 18, 19, 24 have capacitors 32 provided in parallel with the battery 20, and resistors 33 are provided in parallel with the capacitors 32. The voltage detection units 30A, 30B, 30C detect voltages, applied to the capacitors 32, as the above supply voltages. The resistor 33 is provided for discharging the capacitor 32. The results of detection, found in this manner by the voltage detection units 30A, 30B, 30C, are appropriately converted by the conversion units 31A, 31B, 31C, and the conversion products are fed to an ECU 40 to be described later.

The voltage detection units 30A, 30B, 30C are not limited in configuration, and may be configured, for example, as parts of the circuits of the control units 18, 19, 24, or may be composed, for example, of voltage sensors.

The vehicle 10 is provided with a control device (ECU) 40 which exercises overall control over various devices loaded on the vehicle 10. The ECU 40 grasps the operating state of the vehicle 10 based on signals from various sensors provided in the vehicle 10, and generally controls the various devices based on the results obtained.

The ECU 40 further constitutes an abnormality diagnostic apparatus for a vehicle according to the present invention. That is, the ECU 40 has a determination unit 41 which determines whether or not there is an abnormality in the characteristics of the voltage detection units 30A, 30B, 30C of the control units 18, 19, 24.

The determination unit 41 is furnished with a difference calculation unit 42 and an abnormality determination unit 43. The difference calculation unit 42 acquires output values outputted from the voltage detection units 30A, 30B, 30C of the control units 18, 19, 24, and calculates the differences between the output values of the front motor 11, the rear motor 12 and the generator 23. That is, the difference calculation unit 42 acquires the supply voltage Va detected by the voltage detection unit 30A, the supply voltage Vb detected by the voltage detection unit 30B, and the supply voltage Vc detected by the voltage detection unit 30C, and calculates |Va−Vb|, |Vb−Vc|, |Vc−Va| as the differences between them.

The abnormality determination unit 43 determines whether or nor there is a characteristics abnormality in the voltage detection units 30A, 30B, 30C, depending on whether or not the calculation results by the difference calculation unit 42 are equal to or greater than a preset determination threshold value. If any of the calculation results obtained by the difference calculation unit 42 is greater than the determination threshold value V1, for example, it is determined that "there is a characteristics abnormality" in any of the voltage detection units 30A, 30B and 30C. If all of the calculation results obtained by the difference calculation unit 42 are equal to or lower than the determination threshold value V1, on the other hand, it is determined that "there is no characteristics abnormality" in any of the voltage detection units 30A, 30B and 30C.

Based on the calculation results by the difference calculation unit 42, as indicated above, the presence or absence of a characteristics abnormality in the voltage detection units 30A, 30B, 30C can be determined accurately.

According to the present embodiment, moreover, in determining the presence or absence of an abnormality in the voltage detection units 30A, 30B, 30C, the abnormality determination unit 43, for example, counts the results of determination by use of a counter (not shown). When the counter attains a predetermined value, the results of determination are finalized, thereby enhancing the accuracy of abnormality determination. Details in this connection will be described later.

The aforementioned determination threshold value V1 may be decided on, as appropriate, depending on the characteristics, etc. of the electric motor, but is preferably established based on maximum voltage outputted by the battery 20. If the maximum voltage from the battery 20 is Vm, for example, ±X % of Vm is set as the determination threshold value V1. That is, V1 is set at (Vm×2X/100). By this means, the presence or absence of a characteristics abnormality in the voltage detection units 30A, 30B, 30C can be determined more accurately.

Figure 3:
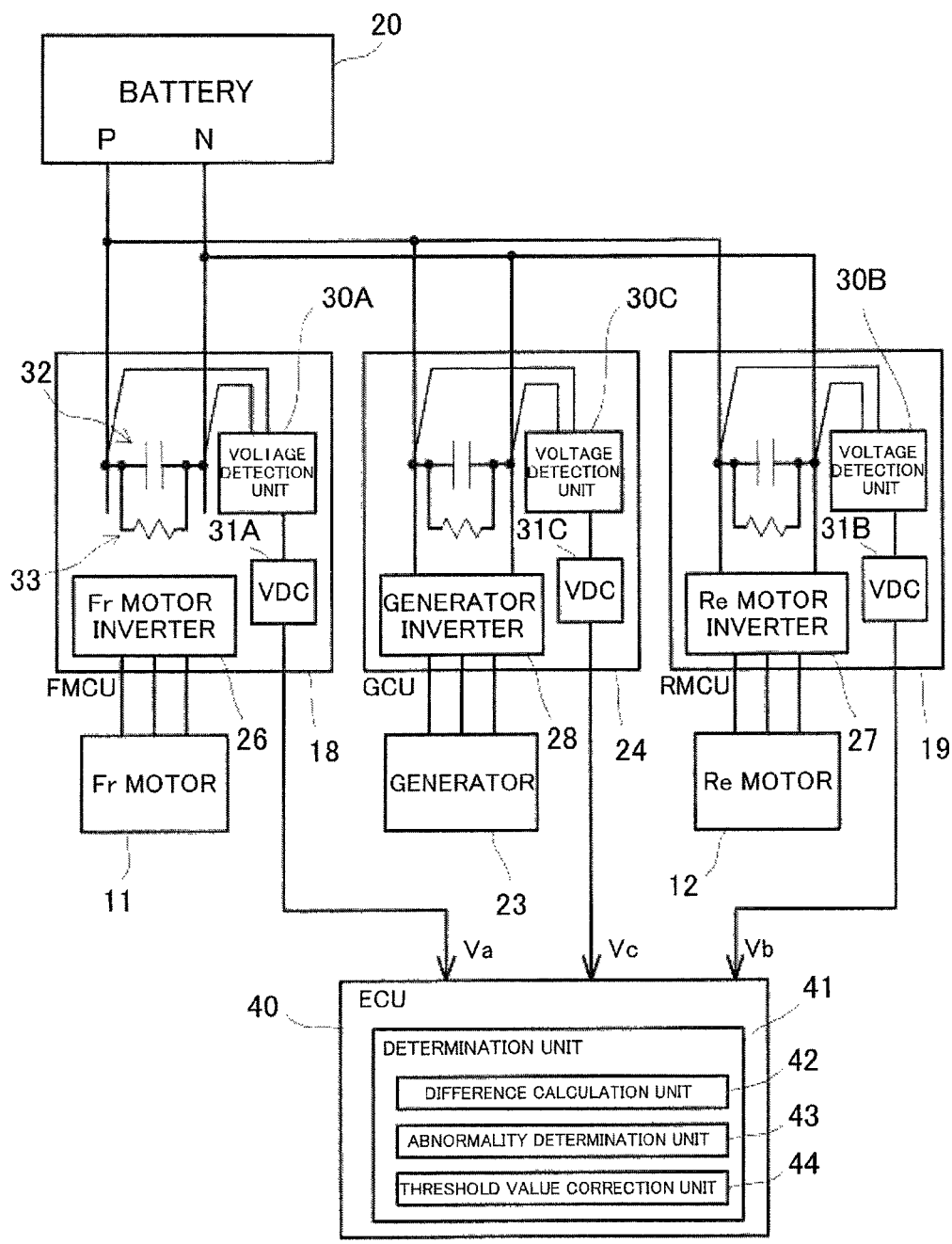
FIG. 3 is a view showing the schematic configuration of the abnormality diagnostic apparatus for the vehicle according to Embodiment 1 of the present invention.

The determination threshold value V1 may always be a constant value, but may be appropriately corrected depending on the state of the battery 20, for example, a decline in voltage. As shown in FIG. 3, for example, the abnormality determination unit 41 may further have a threshold value correction unit 44 which makes a correction for reducing the determination threshold value V1 in response to the state of the battery 20. For example, the determination threshold value V1 may always be set at ±X % of the maximum voltage of the battery 20. In this case, if the maximum voltage of the battery 20 is Vm1 in the initial state, the determination threshold value V1 is set at (Vm1×2X/100) and, if the maximum output of the battery 20 lowers to Vm2, the determination threshold value V1 is changed to (Vm2×2X/100). By correcting the determination threshold value V1 appropriately in this manner, the characteristics abnormality in the voltage detection units 30A, 30B, 30C can be detected at an early stage.

By reference to the flowchart of FIG. 4, an example of abnormality determination control according to the present embodiment will be described below.

Figure 4:
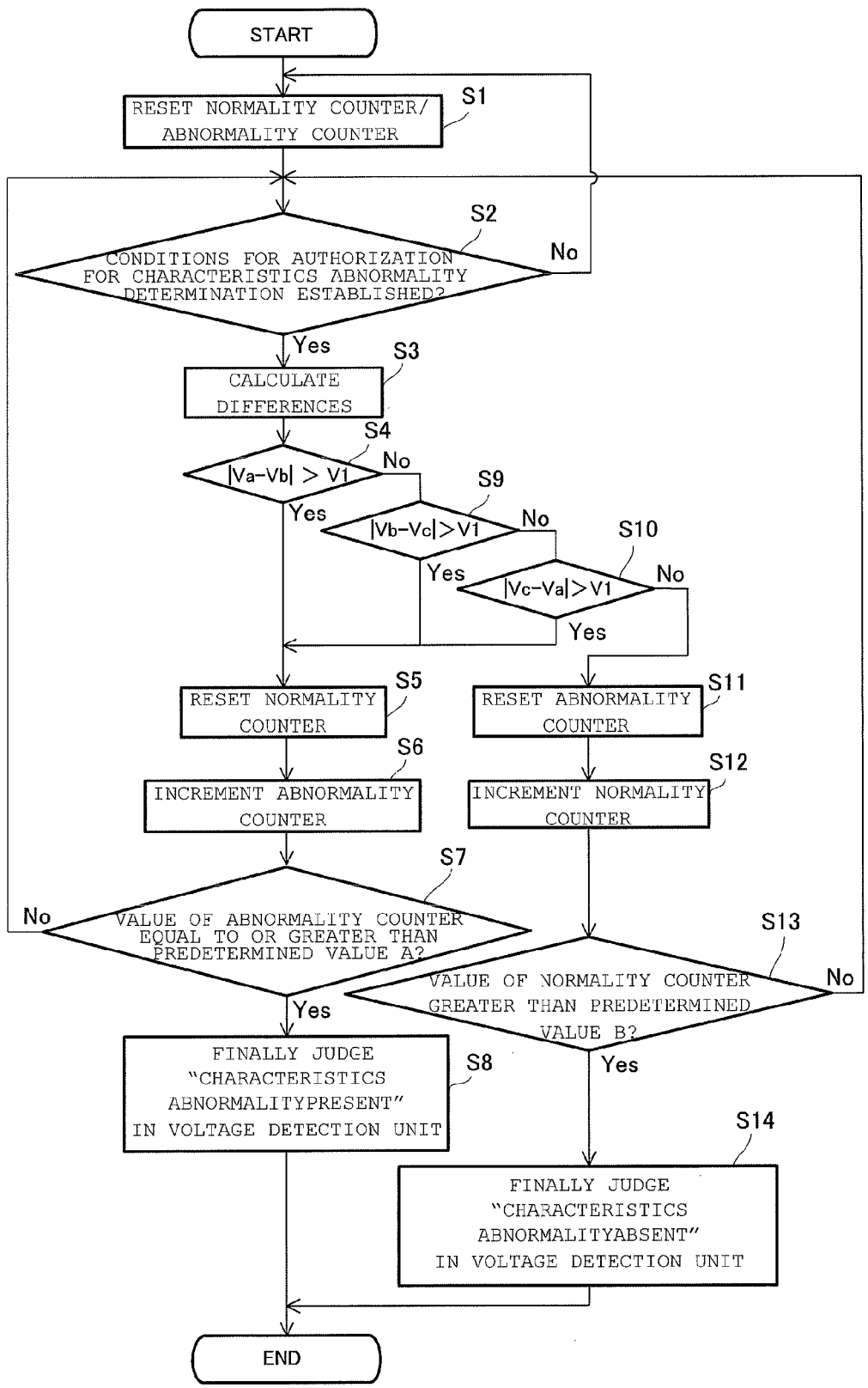
FIG. 4 is a flowchart showing an example of abnormality diagnosis of the vehicle according to Embodiment 1 of the present invention.

When the ignition in the vehicle 10 is turned on, a normality counter and an abnormality counter are reset in Step S1, as shown in FIG. 4. The normality counter is incremented when the result of characteristics abnormality determination shows "characteristics abnormality absent". The abnormality counter is incremented when the result of characteristics abnormality determination shows "characteristics abnormality present".

Then, in Step S2, it is determined whether or not conditions for authorization for characteristics abnormality determination have been established. The conditions for authorization for characteristics abnormality determination are, for example, "the vehicle can run," "the front motor is not driven," "the rear motor is not driven, " and "the generator is not driven". This is because if the front motor or the like is driven, switching of the front motor generator or the like causes variations in supply voltage, and may make it impossible to accurately determine whether there is a characteristics abnormality in the voltage detection unit. If, in the vehicle equipped with a transmission, the shift selection of the transmission is a parking (P) range or a neutral (N) range, for example, that is, if the shift lever of the transmission is in the P range or the N range, the above conditions are fulfilled. Also, if the shift lever of the transmission is in a drive (D) range and the inverter is at a stop, the above conditions are met. Thus, it is preferred to determine whether or not there is a characteristics abnormality in the voltage detection unit 30, on condition that the shift lever is in the P range or the N range, or the shift lever is in the D range and the inverter is stopping. Further, it is preferred that the conditions "an abnormality of the front motor is not detected," "an abnormality of the rear motor is not detected," and "an abnormality of the generator is not detected" be included in the conditions for authorization for characteristics abnormality determination.

If these conditions for authorization for characteristics abnormality determination are established (Step S2: Yes), a determination as to the presence or absence of a characteristics abnormality in the voltage detection units 30A, 30B, 30C is executed in Step S3 or subsequent steps. First, in Step S3, the supply voltage Va detected by the voltage detection unit 30A, the supply voltage Vb detected by the voltage detection unit 30B, and the supply voltage Vc detected by the voltage detection unit 30C are acquired, and |Va−Vb|, |Vb−Vc|, |Vc−Va| as the differences between them are calculated. Then, in Step S4, it is determined whether or not the difference |Va−Vb| is greater than the determination threshold value V1. If the difference |Va−Vb| is greater than the determination threshold value V1 (Step S4: Yes), the normality counter is reset (Step S5), and the abnormality counter is incremented (+1) (Step S6).

Then, in Step S7, it is determined whether or not the value of the abnormality counter is equal to or greater than a predetermined value A. If the value of the abnormality counter is equal to or greater than the predetermined value A (Step S7: Yes), the result of the characteristics abnormality determination of the voltage detection units 30A, 30B, 30C is finalized such that "a characteristics abnormality is present" (Step S8). This completes a series of processings. If, in Step S7, the value of the abnormality counter is less than the predetermined value A (Step S7: No), the program returns to Step S2. Once the conditions for authorization for characteristics abnormality determination are established, a determination as to the presence or absence of a characteristics abnormality in the voltage detection units 30A, 30B, 30C is executed again.

If, in Step S4, the difference |Va−Vb| is equal to or smaller than the determination threshold value V1 (Step S4: No), the program proceeds to Step S9, where it is determined whether or not the difference |Vb−Vc| is greater than the determination threshold value V1. If the difference |Vb−Vc| is greater than the determination threshold value V1 (Step S9: Yes), the program proceeds to Step S5. If the difference |Vb−Vc| is equal to or less than the determination threshold value V1 (Step S9: No), the program proceeds to Step S10, where it is determined whether or not the difference |Vc−Va| is greater than the determination threshold value V1.

If the difference |Vc−Va| is greater than the determination threshold value Vi (Step S10: Yes), the program proceeds to Step S5. If the difference |Vc−Va| is equal to or less than the determination threshold value Vi (Step S10: No), namely, if all differences are equal to or less than the determination threshold value V1, the program proceeds to Step S11. In Step S11, the abnormality counter is reset, whereafter the normality counter is incremented (+1) (Step S12).

Then, in Step S13, it is determined whether or not the value of the normality counter is equal to or greater than a predetermined value B. If the value of the normality counter is equal to or greater than the predetermined value B (Step S13: Yes), the result of the characteristics abnormality determination of the voltage detection units 30A, 30B, 30C is finalized such that "a characteristics abnormality is absent" (Step S14).

This completes a series of processings. If, in Step S13, the value of the normality counter is less than the predetermined value B (Step S13: No), the program returns to Step S2. Once the conditions for authorization for characteristics abnormality determination are established, a determination as to the presence or absence of a characteristics abnormality in the voltage detection units 30A, 30B, 30C is executed again. If the abnormality determination processings result in the determination "characteristics abnormality present", the driver is informed of this determination, for example, by a display on the monitor or the like.

With the present embodiment, as described above, a characteristics abnormality of the voltage detection unit is determined based on the difference between the supply voltages detected by the voltage detection units 30A, 30B, 30C. According to this feature, the characteristics abnormality of the voltage detection unit can be diagnosed accurately. Eventually, the inverter drive voltage for each rotating electric machine can be detected always accurately by the voltage detection unit.

(Embodiment 2)

Figure 5:
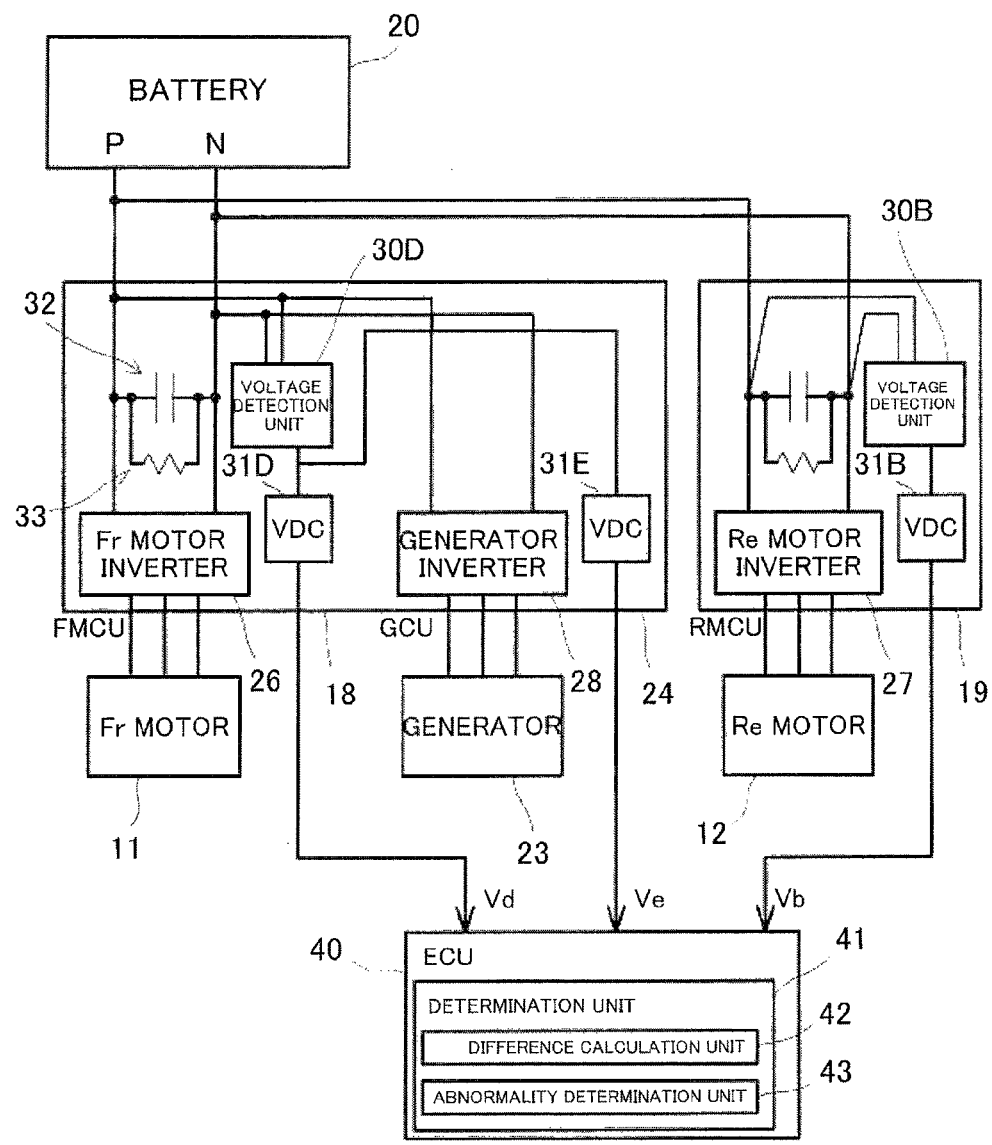
FIG. 5 is a view showing the schematic configuration of an abnormality diagnostic apparatus for a vehicle according to Embodiment 2 of the present invention.

FIG. 5 is a view showing the schematic configuration of an abnormality diagnostic apparatus for a vehicle according to Embodiment 2. In the drawing, the same members as those in Embodiment 1 are assigned the same numerals or symbols as in Embodiment 1, and duplicate explanations are omitted.

Embodiment 1 illustrates a configuration in which the front motor control unit 18, the rear motor control unit 19 and the generator control unit 24, which are rotating electric machine control units, are individually equipped with the voltage detection units. The present embodiment, by contrast, shows an example in which any of the plurality of voltage detection units is provided in such a manner as to be common to any of the plurality of rotating electric machine control units.

Concretely, as shown in FIG. 5, a voltage detection unit 30D provided in a front motor control unit 18 is shared by the front motor control unit 18 and a generator control unit 24. The result of detection detected by the voltage detection unit 30D is converted appropriately by conversion units 31D, 31E, and the results of conversion are fed to an ECU 40 to be described later. In the present embodiment, a front motor 11 and a generator 23 are provided in proximity in a front part of the vehicle, and the front motor control unit 18 and the generator control unit 24 are also provided in proximity. Hence, even when the voltage detection unit 30D is shared, an abnormality in the front motor 11 and the generator 23 can be detected.

In the case of such a configuration, it is preferred for a difference calculation unit 42 to acquire output values outputted from the voltage detection units via the motor control units, and calculate the differences between the acquired output values. That is, the difference calculation unit 42 acquires a supply voltage Vd outputted from the voltage detection unit 30D via the front motor control unit 18, a supply voltage Ve outputted from the voltage detection unit 30D via the generator control unit 24, and a supply voltage Vc outputted from a voltage detection unit 30C via a rear motor control unit 19, and calculates not only |Vc−Vd|, |Vc−Ve|, but also |Vd−Ve| as the differences between them. Based on these calculation results, an abnormality determination unit 43 preferably determines whether or nor there is a characteristics abnormality in the voltage detection units 30C, 30D.

Even the above-mentioned configuration of the present embodiment enables the presence or absence of a characteristics abnormality in the voltage detection units 30C, 30D to be determined accurately, as in the aforementioned embodiment. In the present embodiment, moreover, if any abnormality occurs in a part of the front motor control unit 18 or the generator control unit 24 other than the voltage detection unit 30D, the abnormality of the front motor control unit 18 or the generator control unit 24 can be detected. Since the supply voltage Vd and the supply voltage Ve are values outputted from the same voltage detection unit 30D, the difference |Vd−Ve| is equal to or less than a determination threshold value V1, regardless of whether or not an abnormality exists in the voltage detection unit 30D. If this difference |Vd−Ve| is greater than the determination threshold value V1, it can be determined that some abnormality occurs in a part of the front motor control unit 18 or the generator control unit 24 other than the voltage detection unit 30D. Besides, if one of the differences |Vc−Vd| and |Vc−Ve| is greater than the determination threshold value V1, it can be specified which of the front motor control unit 18 and the generator control unit 24 undergoes an abnormality.

The present invention has been described above in regard to some embodiments thereof, but it is to be understood that the present invention is in way no limited to these embodiments. The present invention can be changed or modified, as appropriate, without departing from its spirit and scope.

EXPLANATIONS OF LETTERS OR NUMERALS

10 Vehicle
11 Front motor (rotating electric machine)
12 Rear motor (rotating electric machine)
13 Engine
14 Front power transmission mechanism
15 Front wheel
16 Rear power transmission mechanism
17 Rear wheel
18 Front motor control unit (rotating electric machine control unit)
19 Rear motor control unit (rotating electric machine control unit)
20 Battery
21 Fuel tank
22 Output system
23 Generator (rotating electric machine)
24 Generator control unit (rotating electric machine control unit)
25 Clutch
26 Front motor inverter
27 Rear motor inverter
28 Generator inverter
30 Voltage detection unit
31 Conversion unit
32 Capacitor
33 Resistor
40 ECU
41 Determination unit
42 Difference calculation unit
43 Abnormality determination unit
44 Threshold value correction unit

The invention claimed is:

1. An abnormality diagnostic apparatus for a vehicle, comprising:
a battery loaded on a vehicle;
a plurality of rotating electric machines electrically connected to the battery, the plurality of rotating electric machines including a front motor, a rear motor, and a generator driven by an engine to generate electricity;
a plurality of rotating electric machine control units for controlling the rotating electric machines;

a plurality of voltage detection units, provided in the rotating electric machine control units, for detecting voltages of power lines connecting the battery and the rotating electric machines;

a difference calculation unit for acquiring output values outputted from the voltage detection units and calculating differences between the acquired output values, when all of the plurality of rotating electric machine control units are stopped; and an abnormality determination unit which, when any of results of calculations by the difference calculation unit is greater than a preset determination threshold value, determines that there is an abnormality in any of the voltage detection units, wherein a driving force of the front motor is transmitted to front wheels, a driving force of the rear motor is transmitted to rear wheels, the plurality of rotating electric machine control units include a front motor control unit, a rear motor control unit, and a generator control unit, the plurality of voltage detection units include, a first voltage detection unit, shared by the front motor control unit and the generator control unit, that detects a voltage of a first power line extending from the battery and connected, in parallel, to the front motor and the generator, and outputs a first output value, and a second voltage detection unit that detects a voltage of a second power line extending from the battery and connected to the rear motor, and outputs a second output value, and the difference calculation unit acquires the first output value outputted from the first voltage detection unit, and the second output value outputted from the second voltage detection unit, and calculates a difference between the first and second output values to determine abnormality in any of the first and second voltage detection units, wherein the abnormality determination unit determines whether or not there is the abnormality by further determining that a shift range of a transmission of the vehicle is in a parking range or a neutral range.

2. The abnormality diagnostic apparatus for a vehicle according to claim 1, further comprising:

a threshold value correction unit for making a correction for decreasing the determination threshold value in accordance with a state of the battery.

3. An abnormality diagnostic apparatus for a vehicle, comprising:

a battery loaded on a vehicle;

a plurality of rotating electric machines electrically connected to the battery, the plurality of rotating electric machines including a front motor, a rear motor, and a generator driven by an engine to generate electricity;

a plurality of rotating electric machine control units for controlling the rotating electric machines;

a plurality of voltage detection units, provided in the rotating electric machine control units, for detecting voltages of power lines connecting the battery and the rotating electric machines;

a difference calculation unit for acquiring output values outputted from the voltage detection units and calculating differences between the acquired output values, when all of the plurality of rotating electric machine control units are stopped; and an abnormality determination unit which, when any of results of calculations by the difference calculation unit is greater than a preset determination threshold value, determines that there is an abnormality in any of the voltage detection units, wherein a driving force of the front motor is transmitted to front wheels, a driving force of the rear motor is transmitted to rear wheels, the plurality of rotating electric machine control units include a front motor control unit, a rear motor control unit, and a generator control unit, the plurality of voltage detection units include, a first voltage detection unit, shared by the front motor control unit and the generator control unit, that detects a voltage of a first power line extending from the battery and connected, in parallel, to the front motor and the generator, and outputs a first output value, and a second voltage detection unit that detects a voltage of a second power line extending from the battery and connected to the rear motor, and outputs a second output value., and the difference calculation unit acquires the first output value outputted from the first voltage detection unit, and the second output value outputted from the second voltage detection unit, and calculates a difference between the first and second output values to determine abnormality in any of the first and second voltage detection units, wherein the abnormality determination unit determines whether or not there is the abnormality by further determining that a shift range of a transmission of the vehicle is in a drive range, and the rotating electric machine control unit is not rotating.

4. The abnormality diagnostic apparatus for a vehicle according to claim 3, further comprising:

a threshold value correction unit for making a correction for decreasing the determination threshold value in accordance with a state of the battery.

* * * * *